A. L. PICKERING.
GAS REGULATOR.
APPLICATION FILED FEB. 12, 1912.
Reissued July 2, 1912. 13,437.
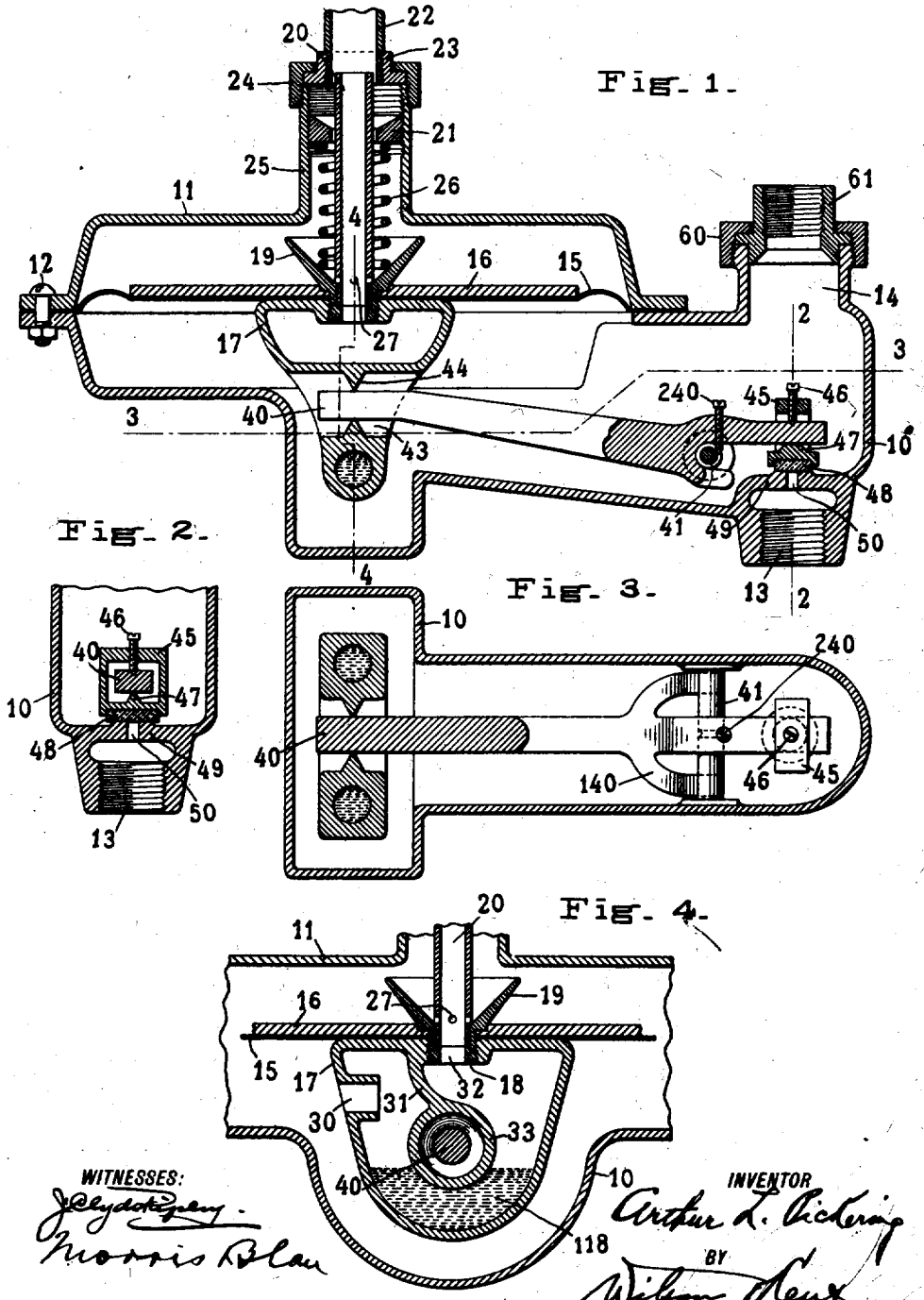
WITNESSES:
J. Clyde Gray
Morris Blau
INVENTOR
Arthur L. Pickering
BY
Wilson Mew
ATTORNEYS.

UNITED STATES PATENT OFFICE.

ARTHUR L. PICKERING, OF ANDERSON, INDIANA.

GAS-REGULATOR.

13,437. Specification of Reissued Letters Patent. Reissued July 2, 1912.

Original No. 1,015,975, dated January 30, 1912, Serial No. 591,429. Application for reissue filed February 12, 1912. Serial No. 667,267.

*To all whom it may concern:*

Be it known that I, ARTHUR L. PICKERING, residing at Anderson, in the county of Madison and State of Indiana, have invented certain new and useful Improvements in Gas-Regulators, of which the following is a specification.

The object of this invention is to provide an improved construction of combined gas seal and regulator in which there is a movable diaphragm, a mercury seal and a lever used for operating the valve which controls the gas inlet.

The features of the invention will be understood from the accompanying drawings and the following description and claims.

In the drawings Figure 1 is a central vertical section through the regulator; Fig. 2 is a vertical section on the line 2—2 of Fig. 1; Fig. 3 is a horizontal section on the line 3—3 of Fig. 1; and Fig. 4 is a vertical section on the line 4—4 of Fig. 1.

There is shown herein a casing consisting of a main portion 10, with the upper side partially open, and a top 11 secured together by bolts 12. At one side portion of the casing there is a gas inlet 13 and above it a gas outlet 14. Between the main part of the casing 10 and the top 11 a flexible diaphragm 15 is secured along its edges, and upon said diaphragm a stiff plate 16 is centrally secured, and beneath the diaphragm there is a mercury seal consisting of a cup 17 for the mercury 118, said cup being secured centrally to the diaphragm 15 and plate 16 by a hollow screw 18 which extends through said diaphragm and plate and carries on its upper end a flaring or funnel shaped basin 19 which surrounds a tube 20, which screws into the bottom of the basin and centrally of the screw 18 and in communication with the opening through said screw. The tube 20 extends through a hollow screw 21 which surrounds it at its upper end and discharges into a tube 22, which is the outlet for excess gas in order to relieve the surplus gas pressure and maintain it uniform. The tube 22 has a collar 23 screwed on it which is held down by the thimble 24, which screws on to the extension 25 from the top 11. The extension 25 is internally threaded for the hollow screw 21. A spring 26 surrounds the tube 20 and rides between the screw 21 and the basin 10 and tends to hold the diaphragm in its downward position. Holes 27 through the lower part of the tube 20 lead into the lower part of the basin 19. The mercury cup has an inlet opening 30 at one side, see Fig. 4, which is in communication with the chamber below the diaphragm and through which the gas enters the mercury cup. Within the cup there is a partition 31 extending from the top of the cup at one side of the outlet 32 down to a cylindrical portion 33, which extends below the middle of the cup. The portions 31 and 33 serve as a partition in association with the mercury which extends above the bottom of the cylinder so as to form an inlet chamber in said cup on one side, and the gas is restrained from passing from one chamber to the other unless its pressure is great enough to force its way through the mercury and under and around the partition or cylinder 33. When it does so, the gas will escape through outlet 32 and tubes 20 and 22.

A lever 40 is fulcrumed on the pin 41 extending transversely in the casing, see Fig. 3. The lever has two downwardly inclined arms 140 adapted to project beneath the pin 41, and a screw 240 screws through the lever, which rests on the pin 41 so as to project beyond the pin 41 somewhat and form means for fulcruming the lever 40 on the pin 41 which cannot escape from said pin excepting when the screw is released. One end of the lever 40 projects through a central opening 43 in the cylinder 33 of the mercury cup. An annular knife edge 44 surrounds the lever 40 to furnish satisfactory bearing. Hence, when the diaphragm moves up or down, said lever 40 will be correspondingly actuated. The other end of the lever 40 projects through a frame 45, see Fig. 2, which has a screw 46 passing through the top thereof into the lever and has also an oval edge bearing 47 on the underside of said lever, and a valve 48 is secured to the underside of said frame so as to normally rest upon the plate 49, through which the inlet port 50 extends. Hence when the diaphragm moves upwardly, the valve will close the inlet port, and when the diaphragm moves downwardly, said valve will be correspondingly opened.

The outlet 14 is externally threaded for the union 60 which clamps on the nipple 61 with which an outlet tube may be connected.

The location of the mercury seal or cup simplifies the construction of the regulator, as it forms a connection between the diaphragm and valve lever and forms part of the weight with the coöperation of the coiled spring 26 to give a determined gas pressure. In relation to the foregoing it serves as a mercury seal. The mercury particles which may be carried up by the surplus gas will fall back over the upper end of the tube 20 and pass through the hollow screw 21 and be collected in the basin 19 and return through the holes 27 and gas outlet 32 to the mercury cup 17.

The valve for controlling the inlet of the gas is so constructed that it may be removed and cleaned or replaced with another without taking the regulator out of line. The lever 40 is so formed or cast that it may be mounted on the fulcrum pin 41, and said fulcrum pin may be cast into the body of the casting and thus prevent the leakage of gas at the point where the fulcrum pin would otherwise be mounted in the casing. There is an inward projection at the inlet 30 which prevents the escape of mercury through said gas inlet.

Having thus described my invention what I claim as new and desire to secure by Letters Patent, is:

1. A gas regulator including a casing having an inlet port, a valve controlling said port, a diaphragm in the casing controlling said valve, a plate centrally secured upon the diaphragm, a mercury cup centrally secured to the underside of the diaphragm and provided with inlet and outlet openings adapted to be separated by mercury so as to form a mercury seal, a fixed outlet passageway leading from the top of the casing, a tube leading from the outlet opening of the mercury cup and discharging into said fixed outlet passageway, and a spring tending to force the diaphragm down.

2. A gas regulator including a casing, having an inlet port, a valve controlling said port, a diaphragm in the casing controlling said valve, a plate centrally secured upon the diaphragm, a mercury cup centrally secured to the underside of the diaphragm and provided with inlet and outlet openings adapted to be separated by mercury so as to form a mercury seal, a fixed outlet passageway leading from the top of the casing, a tube leading from the outlet opening of the mercury cup and discharging into said fixed outlet passageway, a spring surrounding said tube and having holes near the lower end thereof, a basin surrounding the lower part of said tube, and a spring surrounding said tube and bearing down upon said basin so as to tend to press the diaphragm.

3. A gas regulator including a casing having an inlet port, a valve for controlling said port, a diaphragm, a lever for controlling said valve, said lever having a downwardly inclined projection, a fulcrum pin secured within the casing and projecting between the main portion of said lever and the downwardly inclined projection, and a screw extending between the main portion of said lever in position to engage the fulcrum on the side opposite said projection for holding the lever on said fulcrum pin.

4. In a pressure regulator, a casing having an inlet port, a valve controlling said port, a diaphragm in the casing controlling said valve, a fluid reservoir provided with inlet and outlet openings separated by a suitable fluid so as to constitute a seal, said reservoir being secured to said diaphragm and movable therewith, and there being an aperture through the diaphragm communicating with the outlet of said reservoir.

5. In a pressure regulator, a casing, having an inlet port, a valve controlling said port, a diaphragm in the casing controlling said valve, adjustable means for exerting pressure on the diaphragm, a fluid reservoir provided with inlet and outlet openings separated by suitable fluid so as to constitute a seal, said reservoir being secured to said diaphragm and movable therewith, and there being an aperture through the diaphragm communicating with the outlet of said reservoir.

6. In a pressure regulator, a casing, having an inlet port, a valve controlling said port, a diaphragm in the casing controlling said valve, a fluid reservoir provided with inlet and outlet openings separated by a suitable fluid so as to constitute a seal, said reservoir being secured to said diaphragm and movable therewith, a discharge tube connected to the outlet of the reservoir, the diaphragm being apertured for the passage of said tube, and the casing being provided with a tubular outlet portion surrounding said discharge tube of the reservoir.

7. In a pressure regulator, a casing, having an inlet port, a valve controlling said port, a diaphragm in the casing controlling said valve, a fluid reservoir provided with inlet and outlet openings separated by a suitable fluid so as to constitute a seal, said reservoir being secured to said diaphragm and movable therewith, a discharge tube connected to the outlet of the reservoir, the diaphragm being apertured for the passage of said tube, and the casing being provided with a tubular outlet portion surrounding said discharge tube of the reservoir, a coil spring between said tubes, and means adjustably secured in said tubular outlet of the casing engaging the end of said spring.

8. In a pressure regulator, a casing, having an inlet port, a valve controlling said port, a diaphragm in the casing controlling said valve, a fluid reservoir provided with inlet and outlet openings separated by a suitable fluid so as to constitute a seal, said outlet opening being surrounded by a funnel, said reservoir being secured to said diaphragm and movable therewith, and there being an aperture through the diaphragm communicating with the outlet of said reservoir.

9. In a pressure regulator, a casing, a diaphragm therein, a fluid reservoir provided with inlet and outlet openings separated by a suitable fluid so as to constitute a seal, said reservoir being secured to said diaphragm and movable therewith, and there being an aperture through the diaphragm communicating with the outlet of said reservoir, a lever fulcrumed in the casing and engaging said reservoir at one end so as to be pivotally moved thereby, the casing being provided with an inlet, a valve controlling said inlet, said valve being engaged by the other end of said lever.

10. In a pressure regulator, a casing, a diaphragm therein, adjustable means for exerting pressure on the diaphragm, a fluid reservoir provided with inlet and outlet openings separated by a suitable fluid so as to constitute a seal, said reservoir being secured to said diaphragm and movable therewith, and there being an aperture through the diaphragm communicating with the outlet of said reservoir, a lever fulcrumed in the casing and engaging said reservoir at one end so as to be pivotally moved thereby, the casing being provided with an inlet, a valve controlling said inlet, said valve being engaged by the other end of said lever.

11. In a pressure regulator, a casing, a diaphragm therein, a fluid reservoir provided with inlet and outlet openings separated by a suitable fluid so as to constitute a seal, said reservoir being secured to said diaphragm and movable therewith, a discharge tube connected to the outlet of the reservoir, the diaphragm being apertured for the passage of said tube, and the casing being provided with a tubular outlet portion surrounding said discharge tube of the reservoir, a lever fulcrumed in the casing and engaging said reservoir at one end so as to be pivotally moved thereby, the casing, being provided with an inlet, a valve controlling said inlet, said valve being engaged by the other end of said lever.

12. In a pressure regulator, a casing, a diaphragm therein, a fluid reservoir provided with inlet and outlet openings separated by a suitable fluid so as to constitute a seal, said reservoir being secured to said diaphragm and movable therewith, a discharge tube connected to the outlet of the reservoir, the diaphragm being apertured for the passage of said tube, and the casing being provided with a tubular outlet portion surrounding said discharge tube of the reservoir, a coil spring between said tubes, and means adjustably secured in said tubular outlet of the casing engaging the end of said spring, a lever fulcrumed in the casing and engaging said reservoir at one end so as to be pivotally moved thereby, the casing being provided with an inlet, a valve controlling said inlet, said valve being engaged by the other end of said lever.

13. In a pressure regulator, a casing, a diaphragm therein, a fluid reservoir provided with inlet and outlet openings separated by a suitable fluid so as to constitute a seal, said outlet opening being surrounded by a funnel, said reservoir being secured to said diaphragm and movable therewith, and there being an aperture through the diaphragm communicating with the outlet of said reservoir, a lever fulcrumed in the casing and engaging said reservoir at one end so as to be pivotally moved thereby, the casing being provided with an inlet, a valve controlling said inlet, said valve being engaged by the other end of said lever.

14. In a device of the kind described, a casing having an inlet port and provided with a diaphragm, a valve controlling said port, a reservoir secured at one side of the diaphragm and having an opening to the other side of the diaphragm, and a lever loosely engaging said reservoir and moved thereby, said lever controlling said valve.

15. In a device of the kind described, a liquid seal reservoir, having inlet and outlet openings, said inlet being defined by an inwardly extending horizontal tube.

16. In a pressure regulator, a casing, a diaphragm therein, a liquid seal reservoir connected to the diaphragm and opening on opposite sides thereof, an inlet to the casing, a valve controlling the same, and a lever connecting the valve and the reservoir.

In testimony whereof I haxe affixed my signature in the presence of two witnesses.

ARTHUR L. PICKERING.

Witnesses:
WM. H. FORSE, JR.,
GRACE B. FOSTER.